United States Patent [19]
Brothers et al.

[11] Patent Number: 5,454,867
[45] Date of Patent: Oct. 3, 1995

[54] CEMENT AGGLOMERATION

[75] Inventors: Lance E. Brothers, Ninnekah; J. Erlan Longendelpher, Duncan; Donald W. Lindsey, Duncan; Frank L. Sands, Duncan; Kevin D. Edgley, Duncan, all of Okla.

[73] Assignee: Halliburton Company, Duncan, Okla.

[21] Appl. No.: 223,318

[22] Filed: Apr. 5, 1994

Related U.S. Application Data

[63] Continuation of Ser. No. 943,350, Sep. 10, 1992, abandoned.

[51] Int. Cl.$^6$ .................................................. C04B 24/02
[52] U.S. Cl. ..................... 106/724; 106/401; 106/725; 106/802; 106/809; 166/292; 166/293; 405/266
[58] Field of Search ..................... 106/713, 739, 106/724, 400, 401, 802, 809, 725; 166/292, 293; 405/266

[56] References Cited

U.S. PATENT DOCUMENTS

| | | | |
|---|---|---|---|
| 678,748 | 7/1901 | Moller | 106/753 |
| 1,775,313 | 9/1930 | Lellep | 106/753 |
| 2,221,175 | 11/1940 | Bechtold . | |
| 2,648,645 | 8/1953 | Boris | 280/29.6 |
| 3,030,258 | 4/1962 | Wagner | 156/71 |
| 3,645,763 | 2/1972 | Ronzlo et al. | 106/90 |
| 3,663,287 | 5/1972 | Mizunuma et al. | 106/315 |
| 3,826,663 | 7/1974 | Minicozzi et al. | 106/90 |
| 3,920,442 | 11/1975 | Albert et al. | 71/92 |
| 4,119,597 | 10/1978 | Enoue | 260/23 R |
| 4,199,366 | 4/1980 | Schaefer et al. | 106/90 |
| 4,444,925 | 4/1984 | Feldman | 524/4 |
| 4,474,907 | 10/1984 | Genba et al. | 523/206 |
| 4,569,395 | 2/1986 | Carpenter | 166/293 |
| 4,967,839 | 11/1990 | Carpenter et al. | 166/293 |
| 5,120,367 | 6/1992 | Smith et al. | 106/823 |

FOREIGN PATENT DOCUMENTS

| | | |
|---|---|---|
| 2525504 | 6/1975 | Germany . |
| 3012136 | 3/1980 | Germany . |
| 2009204 | 6/1979 | United Kingdom . |

OTHER PUBLICATIONS

Database WPI, Section Ch, Week 8633, Derwent Publications Ltd. London, GB; Class A96, AN 86-214631 & JP-A-61 145 111 (Lion Corp.), Jul. 2, 986, abstract.

Hawley's Condensed Chemical dictionary, Eleventh Edition von Nostrand Reinhold Co., New York, 1987, pp. 19, 750, 751, 931, 945, 947 (no month).

Kosmatka et al. "Design & control of concrete mixtures" Thirteenth edition, PCA, 1988, p. 67 and table 6–1 (no month).

*Primary Examiner*—Mark L. Bell
*Assistant Examiner*—Michael Marcheschi
*Attorney, Agent, or Firm*—Robert A. Kent; Clifford C. Dougherty, III

[57] ABSTRACT

A dry, agglomerated cement material, a method of preparing the dry, agglomerated cement material, a method of cementing, and an apparatus for agglomerating particulate materials. The dry, agglomerated cement material comprises a plurality of particles of a cement bonded together by a water-soluble binder material. The dry, agglomerated cement material is prepared by depositing the water-soluble binder material on the particles such that the binder material bonds the particles together. The inventive agglomerated cement material can be conveniently transported by both pneumatic and non-pneumatic means. The method of cementing comprises the step of mixing the agglomerated cement material with water to form a cement slurry. The agglomerating apparatus comprises: a vessel; a cone blender associated with the vessel such that the cone blender is operable for fluidizing a particulate material placed in the vessel; a fluidizing gas delivery system or delivering a fluidizing gas to the cone blender; and a binder solution delivery system for delivering a binder solution into the vessel.

6 Claims, 3 Drawing Sheets

CEMENT AGGLOMERATION

This is a continuation of application Ser. No. 07/943,350, filed on Sep. 10, 1992, now abandoned.

FIELD OF THE INVENTION

The present invention relates generally to agglomerated particulate materials and to methods of agglomerating particulate materials. More particularly, but not by way of limitation, the present invention relates to dry, agglomerated cement materials, to methods of forming dry, agglomerated cement materials, to methods of cementing, and to apparatus for agglomerating particulate materials.

BACKGROUND OF THE INVENTION

Cement materials (e.g., Portland cement materials) are generally transported from one place to another by pneumatic means (i.e., by blowing). In some instances, it would be more convenient to convey these materials by an alternative means of transport, such as by means of a conveyor and/or an auger. However, due to their fine powdery nature, cement materials generally are not well suited for such alternative means of transport.

Additionally, cement materials tend to pack together and thus resist flow. This condition is worsened by the presence of moisture. Resistance to flow typically results in: reduced dry cement flow rates; the unsteady delivery of cement material to the cement mixing device; the occurrence of dusting at the mixer; and the undesirable retention of significant amounts of "packed" cement material in the cement storage container.

Thus, a need presently exists for a means of agglomerating cement materials (i.e., combining small cement particles to form larger cement particles) such that these materials (1) can be conveniently and efficiently transported by both non-pneumatic means (e.g., by means of a conveyor and/or an auger) and pneumatic means and (2) will resist packing and have improved flow characteristics. The agglomerated cement material should be mixable with water in the normal manner to form a cement slurry. Additionally, when the agglomerated cement material is mixed with water, the individual particles of the cement material must separate so that the cement material can be thoroughly hydrated. Further, the method and/or material used for agglomerating the cement material should not substantially impair the material's cementing effectiveness.

SUMMARY OF THE INVENTION

The present invention provides a dry, agglomerated cement material. The inventive agglomerated cement material comprises a plurality of particles of cement bonded together by a binder material. The binder material is soluble in water.

The present invention also provides a method of agglomerating cement particles. The inventive agglomerating method comprises the step of depositing a water-soluble binder material on the cement particles which bonds the cement particles together.

The present invention additionally provides a method of forming a dry, agglomerated cement material, said method comprising the steps of: (a) fluidizing cement particles and (b) applying a solution comprising a solvent and a water-soluble binder material to the fluidized particles such that the binder material deposits on the fluidized particles and bonds the particles together in an agglomerated form. The present invention also provides a dry, agglomerated cement material formed in accordance with this inventive method.

The present invention further provides a method of cementing. The inventive cementing method comprises the step of mixing an agglomerated cement material with water to form a cement slurry. The agglomerated cement material used in the inventive method of cementing comprises a plurality of cement particles bonded together by a binder material deposited on the particles, said binder material being soluble in water.

The present invention also provides an apparatus for agglomerating particulate materials. The apparatus comprises: a vessel; a cone blender associated with the vessel such that the cone blender is operable for fluidizing a particulate material which has been placed in the vessel; a fluidizing gas delivery means for delivering a fluidizing gas to the cone blender; and a binder solution delivery means for delivering a binder solution into the vessel. Preferably, the cone blender includes means for pulsing the fluidizing gas into the vessel.

The present invention additionally provides a method of forming an agglomerated particulate material, said method comprising the steps of: (a) placing a particulate material in a vessel, said vessel having a frusto-conical portion; (b) fluidizing the particulate material in the vessel by injecting a fluidizing gas into the vessel using a cone blender which is associated with the frusto-conical portion of the vessel; and (c) applying a solution comprising a solvent and a water-soluble binder material to the fluidized particulate material such that the binder material deposits on the fluidized particulate material and bonds the particles of the fluidized particulate material together in an agglomerated form. Preferably, the cone blender comprises means for pulsing the fluidizing gas into the vessel. Further, the fluidizing gas is preferably pulsed into the vessel in step (b).

The flow properties of the inventive agglomerated cement material are substantially superior to the flow properties of untreated hydraulic cement. Compared to untreated hydraulic cement, the inventive agglomerated material (a) consists of substantially larger and rounder particles and (b) has a much lower angle of repose. If desired, the inventive agglomerated cement material can have a particle size similar to that of Oklahoma No. 1 sand. Thus, the inventive agglomerated cement material resists packing and can be conveniently and efficiently transported by non-pneumatic means (e.g., by conveyor and/or by auger) and by pneumatic means. The inventive agglomerated cement material can also be mixed with water to form a cement slurry using normal cement mixing procedures and equipment. Additionally, since the binder material used in the present invention is water-soluble, the individual particles of the inventive agglomerated cement material are released when the cement material is mixed with water so that the cement material can be thoroughly hydrated. Further, the water-soluble binder material used in forming the inventive agglomerated cement material does not substantially impair the cement material's cementing effectiveness.

Other objects, features, and advantages of the present invention will be readily apparent to those skilled in the art upon reference to the accompanying drawings and upon reading the following description of the preferred embodiments.

DESCRIPTION OF THE PREFERRED EMBODIMENTS

Figure 1:
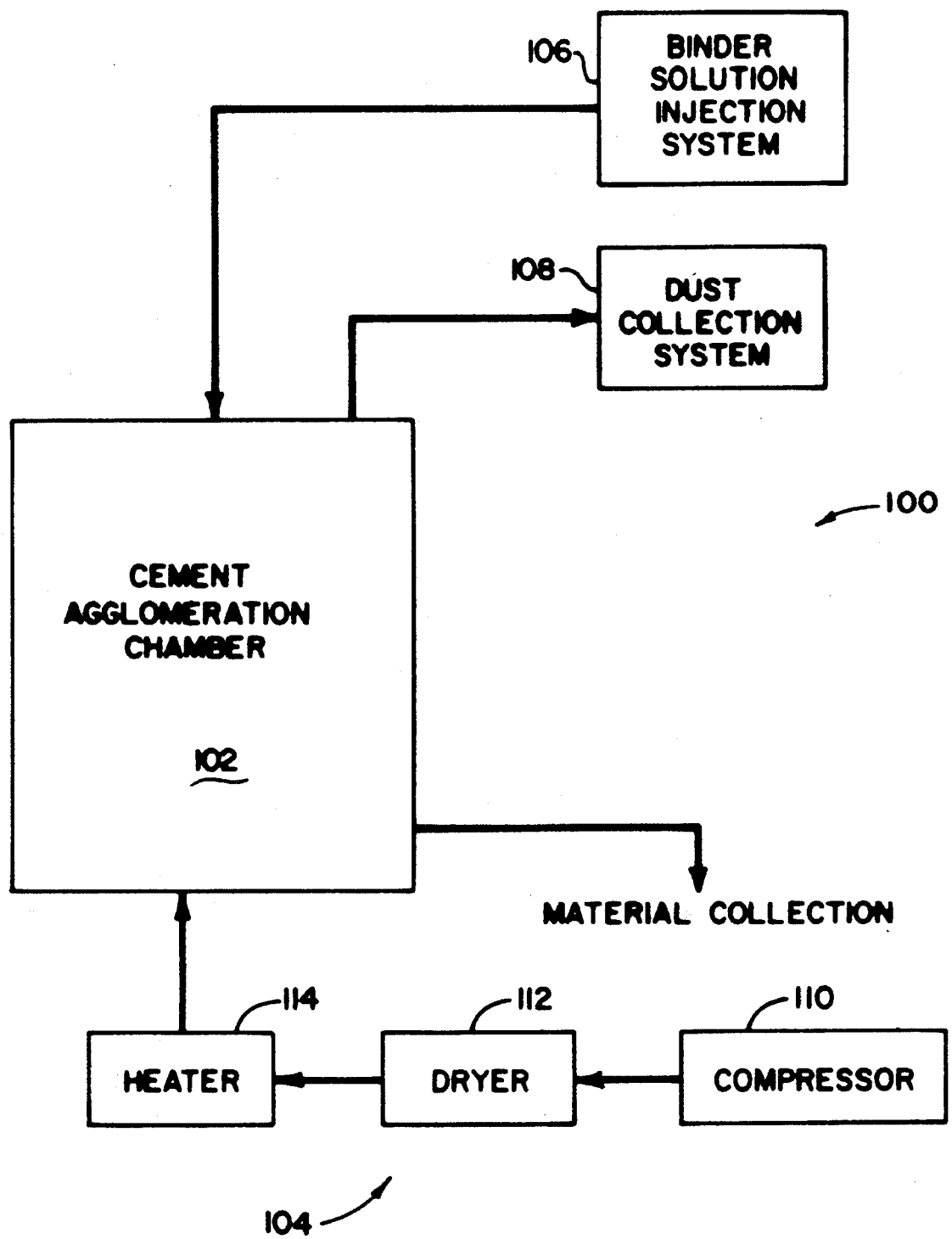
FIG. 1 provides a schematic illustration of an agglomeration system useful for performing the method of the present invention.

As indicated above, the present invention provides a dry, agglomerated cement material comprising a plurality of cement particles bonded together by a water-soluble binder material. The inventive agglomerated cement material preferably also comprises at least one dispersant deposited on the cement particles. Additionally, the inventive agglomerated cement material preferably has a specific surface area in the range of from about 0.050 to about 0.300 $m^2/cc$.

The cement material which is agglomerated in accordance with the present invention can generally be any hydraulic cement. As defined in *Hawley's Condensed Chemical Dictionary*, 11th Edition, Van Nostrand Reinhold Company, 1987, a hydraulic cement is any mixture of fine-grained lime, alumina, and silica that will set to a hard product by admixture of water which combines chemically with other ingredients to form a hydrate. Examples of typical hydraulic cements include Portland cement and iron ore (i.e., slag) cement. The cement material used in the present invention is preferably Portland cement.

The binder material used in the present invention must be soluble in water such that, when the inventive agglomerated cement material is mixed with water, the binder material dissolves and the individual particles of the cement material are thereby released and allowed to hydrate. The binder material must also possess sufficient bonding strength to hold the agglomerated particles together. Further, the binder material is preferably a material which will not substantially impair the cementing effectiveness of the cement material.

Examples of polymeric binder materials suitable for use in the present invention include: polyvinylpyrrolidone; polyvinylsulfonate; polyacrylic acid; polymethacrylic acid; poly 2-acrylamido-2-methylpropanesulfonic acid; polyacrylamide; polystyrenesulfonate; partially hydrolyzed polyvinylacetate; polyvinyl alcohol; copolymers thereof; and mixtures thereof.

The binder material most preferred for use in the present invention is polyvinyl alcohol. As used herein, the term "polyvinyl alcohol" refers to polymers of the structure $-(CH_2CH(OH))-_n$ and to random copolymers obtained by the incomplete hydrolysis of polyvinylacetate. As is well known in the art, polyvinylacetate can be converted to polyvinyl alcohol by replacing the acetate groups of the vinylacetate polymer with hydroxyl groups. This process is generally referred to as a "hydrolysis" process. As used herein, the term "degree of hydrolysis" refers to the percentage of acetate groups contained in the vinylacetate polymer which have been replaced with hydroxyl groups.

Generally speaking, as the degree of hydrolysis and the molecular weight of a polyvinyl alcohol material increases, the polyvinyl alcohol becomes less soluble in water. However, if the degree of hydrolysis and the molecular weight of the polyvinyl alcohol are too low, the bonding properties of the polyvinyl alcohol will not be sufficient to meet the requirements of the present invention.

In order to obtain both sufficient water solubility and sufficient bonding strength to meet the requirements of the present invention, the polyvinyl alcohol used in the present invention will preferably have: (1) a degree of hydrolysis which is less than about 92% and is most preferably in the range of from about 87% to about 89% and (2) a molecular weight which is (a) in the range of from about 10,000 to about 100,000, (b) more preferably in the range of from about 30,000 to about 80,000, and (c) most preferably in the range of from about 55,000 to about 66,000.

Examples of commercially available polyvinyl alcohol products suitable for use in the present invention include ELVANOL 52-22 and ELVANOL 51-05, both of which are available from du Pont.

The inventive agglomerated cement material preferably has an amount of dispersant deposited thereon sufficient to reduce the viscosity of a cement slurry formed by mixing the inventive agglomerated cement material with water. The dispersant used in the present invention can generally be any dispersant which is commonly used in drilling fluids or in cementing compositions. Examples of dispersants suitable for use in the present invention include: condensation products formed by condensing naphthalene sulfonic acid with formaldehyde and condensation products formed by condensing sulfonated acetone with formaldehyde. Naphthalene sulfonic acid/formaldehyde condensates used in the present invention will preferably have molecular weights in the range of from about 3,000 to about 6,000.

The inventive agglomerated cement material can further comprise one or more particulate additives which have been mixed with, and agglomerate along with, the hydraulic cement material. Examples of typical additives used in cementing compositions include: accelerators such as calcium chloride; retarders; dispersants, and fluid loss additives.

The inventive dry, agglomerated cement material is preferably produced by a method comprising the steps of: (a) fluidizing a dry, particulate cement material (e.g., Portland cement or slag cement) and (b) applying a binder material solution to the fluidized particles of the cement material such that the binder material deposits on the fluidized cement particles and bonds the cement particles together. If desired, one or more particulate cementing additives can be blended and fluidized with the particulate cement material in accordance with step (a) and then bonded together with the cement material in accordance with step (b). The binder material solution used in the inventive method preferably comprises a binder material of the type identified hereinabove and a solvent.

The particulate material agglomerated in accordance with the inventive agglomerating method (i.e., the dry, particulate cement material and any particulate additives which are to be agglomerated along with the cement material) is preferably fluidized in step (a) of the inventive method in a fluidizing chamber by conducting a gas (preferably air) through the chamber. As the gas travels through the fluidizing chamber, the gas preferably evaporates the binder material solution solvent and then carries the evaporated solvent out of the fluidizing chamber such that the binder material is caused to deposit on the fluidized particulate material. When the solvent used in the binder material solution is water, said water is preferably removed from the fluidizing chamber quickly such that the fluidized cement material is not substantially hydrated during the inventive agglomeration process.

In order to further guard against the occurrence of cement hydration during the inventive agglomeration process, any excess moisture contained in the fluidizing gas is preferably removed from the fluidizing gas (e.g., by drying) before the fluidizing gas enters the fluidizing chamber.

The amount of binder material solution applied to the fluidized particulate material in step (b) of the inventive method is preferably an amount sufficient to provide an agglomerated product having a specific surface area in the range of from about 0.050 to about 0.300 m$^2$/cc. A product material having a specific surface area greater than about 0.300 m$^2$/cc will generally not be sufficiently agglomerated to allow efficient transport by non-pneumatic means. However, an agglomerated product material having a specific surface area of less than about 0.050 m$^2$/cc generally cannot be readily blended with water to form a cement slurry. The amount of binder material solution applied to the fluidized particulate material in step (b) of the inventive method is most preferably an amount sufficient to provide an agglomerated product having a specific surface area in the range of from about 0.100 to about 0.200 m$^2$/cc.

The binder material solution used in step (b) of the inventive method is preferably an aqueous binder material solution having a binder material concentration of at least about 2% by weight based on the total weight of the solution. The aqueous binder material solution will more preferably have a binder material concentration in the range of from about 2% to about 10% by weight based on the total weight of the binder material solution. Most preferably, the aqueous binder material solution will have a binder material concentration of about 5% by weight based on the total weight of the binder material solution.

In a particularly preferred embodiment of the inventive method, the binder material solution used in step (b) of the inventive method is an aqueous polyvinyl alcohol solution. The aqueous polyvinyl alcohol solution preferably has a polyvinyl alcohol concentration in the range of from about 2% to about 10% by weight based on the total weight of the solution. Additionally, the aqueous polyvinyl alcohol solution is preferably applied to the fluidized particulate material in step (b) of the inventive method in an amount in the range of from about 50 to about 200 parts by weight per 1,000 parts by weight of fluidized material. Most preferably, the aqueous polyvinyl alcohol solution used in this embodiment of the inventive method has a polyvinyl alcohol concentration of about 5% by weight based on the total weight of the solution.

The binder material solution used in step (b) of the inventive method preferably also contains a dispersant of the type described hereinabove. As the solvent of the binder material solution is carried out of the fluidizing chamber by the fluidizing gas, the dispersant deposits, along with the binder material, on the fluidized particulate material. As indicated above, the dispersant is preferably deposited on the fluidized material in an amount sufficient to reduce the viscosity of a slurry formed by mixing the inventive agglomerated material with water.

When the dispersant used in the inventive method is a naphthalene sulfonic acid/formaldehyde condensate, a sulfonated acetone/formaldehyde condensate, or a combination thereof, the dispersant (1) is preferably present in the binder material solution in an amount in the range of from about 1% to about 10% by weight based on the total weight of the binder material solution and (2) is most preferably present in the binder material solution in an amount of about 5% by weight based on the total weight of the binder material solution.

In one particularly preferred embodiment of the inventive method, the binder material solution used in step (b) is an aqueous polyvinyl alcohol solution, the binder material solution contains a dispersant which is a naphthalene sulfonic acid/formaldehyde condensate, a sulfonated acetone/formaldehyde condensate, or a combination thereof, the binder material solution has a polyvinyl alcohol concentration in the range of from about 2% to about 10% by weight based on the total weight of the solution, and the dispersant is present in the binder material solution in an amount in the range of from about 1% to about 10% by weight based on the total weight of the binder material solution. The binder material solution used in this embodiment of the inventive method is preferably applied to the fluidized particulate material in step (b) of the inventive method in an amount in the range of from about 50 to about 200 parts by weight per 1,000 parts by weight of the fluidized material. The binder material solution used in this embodiment of the inventive method most preferably has a polyvinyl alcohol concentration of about 5% by weight based on the total weight of the binder material solution and a dispersant concentration of about 5% by weight based on the total weight of the binder material solution.

In another particularly preferred embodiment of the inventive method, the cement material treated in accordance with the inventive method is a class H cement, the binder material solution is an aqueous polyvinyl alcohol solution, the binder material solution contains a dispersant selected from naphthalene sulfonic acid/formaldehyde condensates, sulfonated acetone/formaldehyde condensates, or combinations thereof, the binder material solution has a polyvinyl alcohol concentration in the range of from about 2% to about 10% by weight based on the total weight of the solution, the binder material solution has a dispersant concentration in the range of from about 1% to about 10% by weight based on the total weight of the binder material solution, and the binder material solution is applied to the fluidized particulate material in step (b) of the inventive method in an amount in the range of from about 50 to about 150 parts by weight per 1,000 parts by weight of the fluidized material. Most preferably, the binder material solution used in this embodiment of the inventive method has a polyvinyl alcohol concentration of about 5% by weight based on the total weight of the solution and a dispersant concentration of about 5% by weight based on the total weight of the binder material solution.

In another particularly preferred embodiment of the inventive method, the cement material treated in accordance with the inventive method is a class A cement, the binder material solution is an aqueous polyvinyl alcohol solution, the binder material solution contains a dispersant selected from naphthalene sulfonic acid/formaldehyde condensates, sulfonated acetone/formaldehyde condensates, or combinations thereof, the binder material solution has a polyvinyl alcohol concentration in the range of from about 2% to about 10% by weight based on the total weight of the solution, the dispersant is present in the binder material solution in an amount in the range of from about 1% to about 10% by weight based on the total weight of the solution, and the binder material solution is applied to the fluidized material in step (b) of the inventive method in an amount in the range of from about 100 to about 200 parts by weight per 1,000 parts by weight of the fluidized material. Most preferably, the binder material solution used in this embodiment of the inventive method has a polyvinyl alcohol concentration of about 5% by weight based on the total weight of the binder material solution and a dispersant concentration of about 5% by weight based on the total weight of the binder material solution.

As indicated above, the agglomerated cement material of the present invention can be mixed with water using normal cement mixing procedures and equipment to form a cement slurry. When the inventive agglomerate is mixed with water, the binder material of the inventive agglomerate dissolves such that the individual cement particles of the agglomerate are released and allowed to hydrate. Desired cementing additives can be blended with the cement slurry in the normal manner. Alternatively, as also indicated above, desired dry, particulate cementing additives can be preincorporated in the inventive agglomerate material. These preincorporated additives are released into the cement slurry when the binder material of the inventive agglomerate dissolves.

In order to (a) ensure that the binder material of the inventive agglomerate completely dissolves and (b) improve the cementing effectiveness of the cement slurry formed from the inventive agglomerate, it is preferred that (1) an increased mixing time be used in forming the slurry, (2) an increased amount of shear be imparted to the slurry during mixing, and/or (3) an accelerator, such as calcium chloride, be added to the cement slurry.

The cement slurry formed from the inventive agglomerate can be used in generally the same manner as any other cement slurry. For example, the cement slurry can be used to cement a casing in a well bore by pumping the slurry down through the interior of the casing such that the slurry flows out of the casing and then into the annulus between the casing and the wall of the well bore.

A schematic illustration of an agglomerating system 100 useful for conducting the inventive cement agglomeration method is illustrated in FIG. 1. System 100 comprises: a cement agglomeration chamber 102; a fluidizing gas delivery system 104; a binder solution injection system 106; and a dust collection system 108. Fluidizing gas delivery system 104 comprises a compressor 110, a fluidizing gas dryer 112, and a fluidizing gas heater 114.

Figure 2:
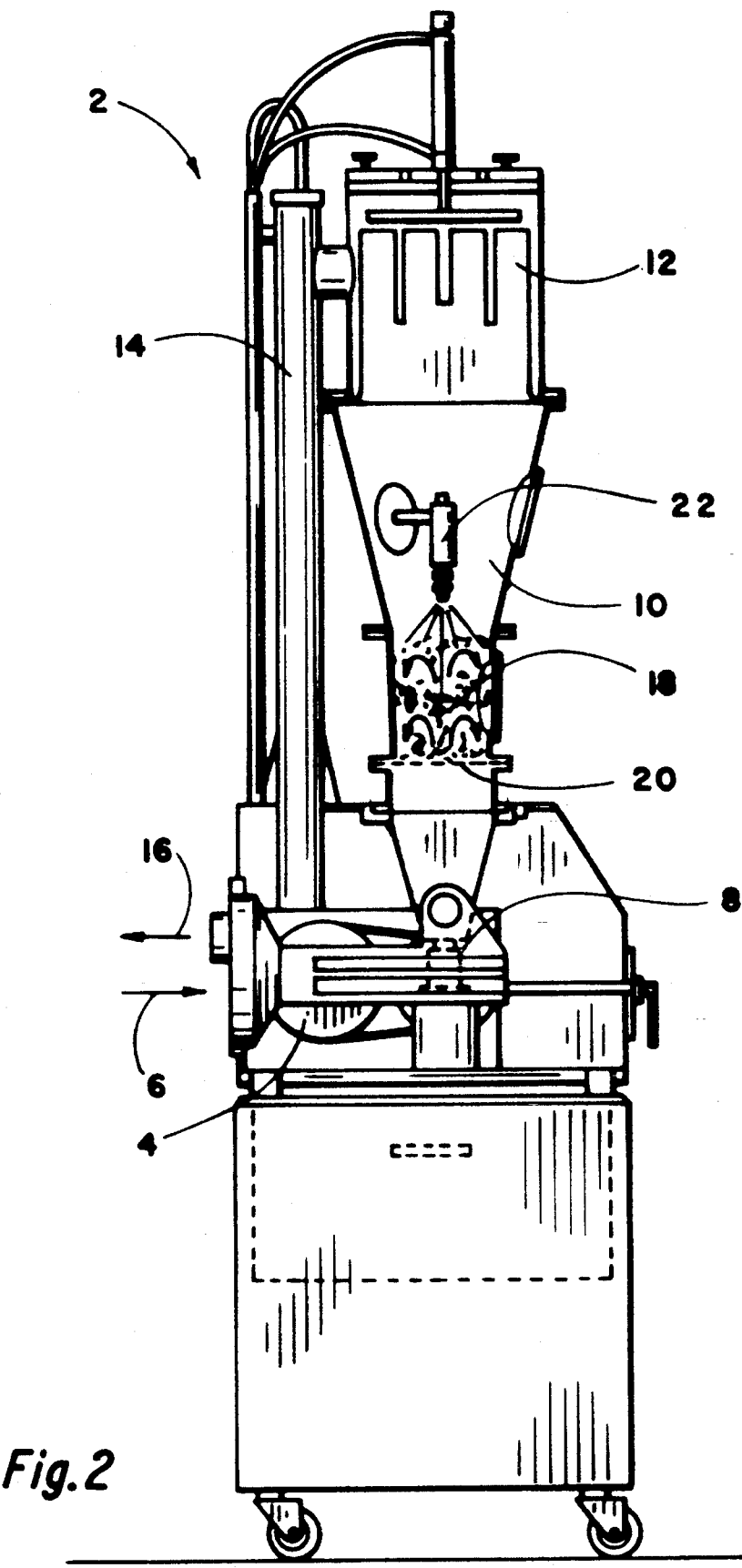
FIG. 2 provides a partially cutaway elevational side view of an apparatus 2 useful in performing the method of the present invention.

A particular apparatus 2 useful for conducting the inventive method is depicted in FIG. 2. Apparatus 2 is a UNI-GLATT apparatus manufactured by Glatt Process Technology. Apparatus 2 basically comprises: an air blower 4; an air inlet 6; an air heater 8; a fluidizing chamber 10; an air filter 12; an air outlet manifold 14; and an air outlet 16. A cement material 18 to be treated in accordance with the inventive method is placed in fluidizing chamber 10 of apparatus 2 on top of a fine screen 20. The binder material solution used in the inventive method is delivered to fluidizing chamber 10 via a spray nozzle 22.

Fluidizing air is conducted by blower 4 of apparatus 2 from air inlet 6 through air heater 8, through screen 20, and upward through fluidizing chamber 10. As the hot fluidizing air stream is conducted upward through chamber 10, the binder material solution is sprayed into chamber 10 via spray nozzle 22. The hot fluidizing air stream operates to (1) fluidize the cement material 18 contained in chamber 10, (2) evaporate the solvent portion of the binder material solution, and (3) carry the evaporated solvent out of chamber 10. As a result, the remaining components of the binder material solution (i.e., the water-soluble binder material and preferably a dispersant) deposit on the fluidized cement material 18 in chamber 10 and cause the fluidized cement material to agglomerate.

The rate at which fluidizing air is conducted through chamber 10, the temperature of the fluidizing air stream, the rate at which binder material solution is delivered to chamber 10, and the fineness of the binder material solution spray used in chamber are adjusted, as necessary, to ensure that (1) cement material 18 remains fluidized throughout the inventive agglomeration process and (2) any water contained in the binder material solution is quickly removed from chamber 10 such that the fluidized cement material does not undergo substantial hydration during the agglomeration process. As a result, the agglomerated cement particles formed in the inventive agglomeration process are bound and dry.

When the binder material solution used in the inventive agglomeration process is an aqueous solution, the fluidizing air stream conducted through fluidizing chamber 10 of apparatus 2 is preferably heated in heater 8 to a temperature in the range of from about 40° C. to about 100° C. Most preferably, the fluidizing air stream is heated in heater 8 to a temperature of about 60° C. before being conducted through fluidizing chamber 10.

Figure 3:
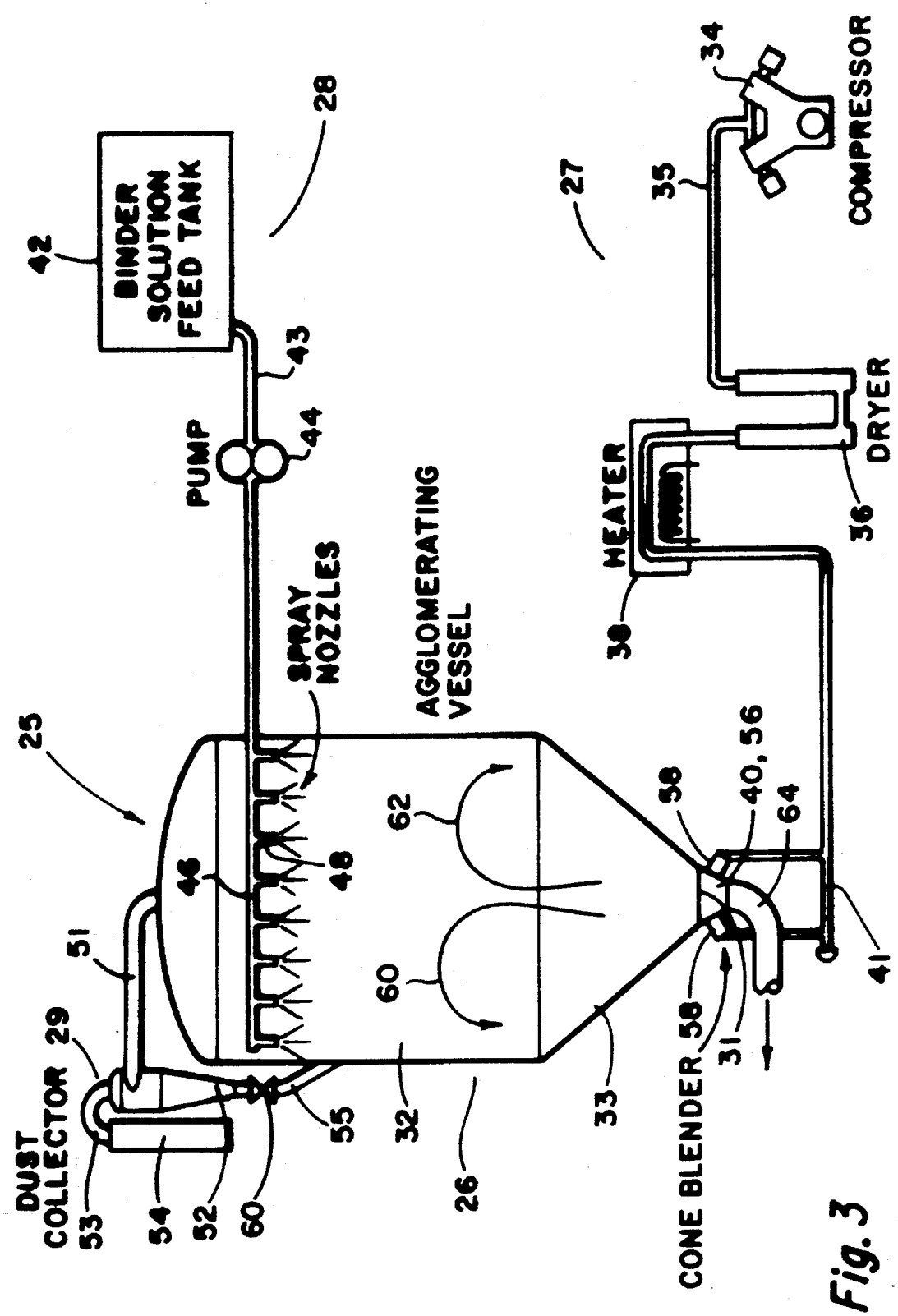
FIG. 3 provides a schematic view of an inventive apparatus 25 useful in performing the method of the present invention.

An inventive agglomerating apparatus 25 preferred for use in conducting the inventive method is depicted in FIG. 3. Apparatus 25 comprises: an agglomerating vessel 26; a fluidizing gas delivery system 27 for delivering fluidizing gas to agglomerating vessel 26; a binder solution delivery system 28 for delivering a binder material solution to agglomerating vessel 26; and a dust collection system 29 for removing dust from the fluidizing gas stream as the fluidizing gas stream is exhausted from agglomerating vessel 26. Unlike apparatus 2 depicted in FIG. 2, inventive apparatus 25 provides an economical means for producing large quantities of the inventive agglomerate material. Inventive apparatus 25 also provides a convenient means for (1) dry mixing cement materials and/or cementing additives and (2) agglomerating these mixtures.

Agglomerating vessel 26 of apparatus 25 comprises an upper cylindrical portion 32 and a lower frusto-conical portion 33. Frusto-conical portion 33 includes an opening 31 at the bottom thereof. Additionally, agglomerating vessel 26 preferably includes a hatch opening (not shown) at the top or in the side thereof for feeding a dry hydraulic cement material, as well as any additives which are to be mixed with and agglomerated with the cement material, into the agglomerating vessel.

The fluidizing gas delivery system 27 of apparatus 25 preferably comprises: a fluidizing gas compressor 34 for supplying a fluidizing gas to apparatus 25; a dryer 36 for removing moisture from the fluidizing gas; a conduit 35, connected between compressor 34 and dryer 36, for conducting the fluidizing gas from compressor 34 to dryer 36; a heater 38 for heating the fluidizing gas in accordance with the inventive agglomeration method; a conduit 37, connected between dryer 36 and heater 38, for conducting dry fluidizing gas from dryer 36 to heater 38; a cone blender 40 connected to the bottom of agglomerating vessel 26 at opening 31; a fluidizing gas distribution manifold 41 associated with cone blender 40; and a conduit 39, connected between heater 38 and distribution manifold 41, for conducting heated fluidizing gas from heater 38 to distribution manifold 41. Preferably, compressor 34 is an air compressor and the fluidizing gas used in apparatus 25 is air.

Dryer 36 can be a regenerative-type dryer, a refrigeration-type dryer, a chemical dryer, or generally any other type dryer which will operate to remove excess moisture from the fluidizing gas stream. Excess moisture is removed from the fluidizing gas stream such that (1) said excess moisture is prevented from hydrating the cement material contained in agglomerating vessel 26 and (2) the fluidizing gas stream will more effectively operate, in accordance with the inventive method, to evaporate the solvent of the binder material solution and remove said solvent from agglomerating vessel 26.

Cone blender 40 will typically comprise: a frusto-conically shaped collar 56 which connects to the bottom of agglomerating vessel 26, said collar having a passageway extending therethrough which communicates with opening 31 of vessel 26; a plurality of fluidizing gas injection ports which are equally spaced about the circumference of collar 56 and which extend through the wall of collar 56; and a plurality of solenoid actuated pistons 58 associated with the injection ports which operate to open and close the injection ports such that fluidizing gas is pulsed through the injection ports and into the agglomerating vessel. Solenoid actuated pistons 58 preferably operate such that the fluidizing gas is simultaneously pulsed through all of the injection ports.

Due to the arrangement of the injection ports about the circumference of collar 56, the fluidizing gas which flows through each individual injection port is directed upward and toward the center of agglomerating vessel 26. Consequently, as the fluidizing gas is pulsed through the injection ports, the material contained in agglomerating vessel 26 is fluidized and "rolled" in vessel 26 in the manner generally indicated in FIG. 2 by arrows 60 and 62. The rate of fluidizing gas flow through the injection ports and the pulsation frequency of the cone blender are established such that fluidization is continuously maintained in the agglomerating vessel. The continuous fluidization and "rolling" of the material in vessel 26 ensures that the entire batch of material contained in vessel 26 is evenly exposed to the binder material solution.

When the inventive agglomeration process is completed, the agglomerated product material contained in agglomerating vessel 26 flows through the passageway of collar 56 and into a product discharge line 64 which is connected to the bottom of collar 56. Preferably, a butterfly valve, or similar valve means, is positioned between collar 56 and discharge line 64 for holding material in agglomerating vessel 26 when the cone blender is not in operation.

Generally any commercial cone blender can be used in inventive apparatus 25. The Model 244 cone blender manufactured by NOL-TEC SYSTEMS, Inc. is an example of a commercial cone blender which is particularly well suited for use in the present invention.

As suggested above, inventive apparatus 25 can be used to agglomerate either a single cement material or a mixture of dry cement materials and/or dry cementing additives. If apparatus 25 is used to agglomerate a mixture of dry materials, these materials can be thoroughly blended in agglomerating vessel 26 using fluidizing gas delivery system 27. Preferably, binder material solution is not introduced into vessel 26 until the materials contained in vessel 26 have been thoroughly blended.

Binder solution delivery system 28 comprises: a binder solution feed tank 42; an injection pump 44; a conduit 43, connected between tank 42 and the suction of pump 44, for conducting binder solution from tank 42 to pump 44; a binder solution injection header 46 positioned inside the upper cylindrical portion 32 of agglomerating vessel 26; a conduit 45, connected between injection header 46 and the discharge of pump 44, for conducting binder solution from pump 44 to header 46; and one or more spray nozzles 48 projecting from injection header 46. A sufficient number of spray nozzles 48 are preferably provided in apparatus 25 to ensure that the binder solution is distributed over the entire cross-section of cylindrical portion 32 of agglomerating vessel 26.

While cone blender 56 is used to fluidize and roll the material contained in agglomerating vessel 26, binder material solution is sprayed into vessel 26 using binder solution delivery system 28 such that: (1) the individual particles of the material contained in vessel 26 are coated with the binder material and are thereby caused to stick together (i.e., to agglomerate); (2) the solvent of the binder material solution is evaporated by the fluidizing gas; (3) and the fluidizing gas carries the evaporated solvent out of vessel 26. During this agglomeration process, the binder material solution can be continuously fed to agglomerating vessel 26. Alternatively, the binder material solution can be pulsed into vessel 26 in conjunction with the pulsed operation of cone blender 40.

Dust collector system 29 of apparatus 25 preferably comprises: a cyclone separator 52 for removing particulates from the fluidizing gas flowing out of agglomerating vessel 26; a conduit 51, connected between cyclone 52 and the top of agglomerating vessel 26, for conducting the fluidizing gas from vessel 26 to cyclone 52; a bag filter 54 for further purifying the fluidizing gas leaving vessel 26 and cyclone 52; a conduit 53, connected between cyclone 52 and bag filter 54, for delivering the fluidizing gas from cyclone 52 to filter 54; and a conduit 55, connected between the bottom of cyclone 52 and the side of agglomerating vessel 26, for returning the particulate material collected in cyclone 52 to vessel 26. Cyclone 52 is preferably positioned with respect to vessel 26 such that the particulate material collected in cyclone 52 flows gravitationally from cyclone 52 to agglomerating vessel 26 via conduit 55. In order to (1) allow the material collected in cyclone 26 to gravitationally flow to vessel 26 and (2) prevent the operation of cyclone 26 from being upset, a butterfly valve 60 which closes when fluidizing gas is pulsed into vessel 26 and opens when the flow of fluidizing gas is interrupted is preferably included in conduit 55.

When the fluidizing gas used in the inventive method is air and the binder material solution solvent used in the inventive method is water, the fluidizing gas leaving bag filter 54 is preferably exhausted to the atmosphere.

As will be readily apparent to those skilled in the art, the inventive method and apparatus disclosed herein can also be used, in like manner, to agglomerate particulate materials other than cement.

The following examples are provided in order to further illustrate the present invention.

EXAMPLE 1

Twelve cement material samples were prepared for testing. The composition of each sample and the manner in which each sample was prepared are set forth in Table I. As indicated in Table I, sample 1 consisted of untreated class H Portland cement. Samples 2 through 12, on the other hand, consisted of cement materials which were treated in accordance with the inventive agglomeration method in an apparatus 2 of the type depicted in FIG. 1. Samples 2–10 and 12 were prepared using a class H Portland cement. Sample 11 was prepared using a class A Portland cement. The polyvinyl alcohol (PVA) solution used in preparing each of samples 2–11 consisted of 5 parts by weight (pbw) PVA dissolved in 95 pbw of water. The PVA solution used in preparing sample 12 consisted of 5 pbw PVA and 5 pbw of a sulfonated acetone/formaldehyde condensate dispersant dissolved in 90 pbw of water.

As indicated in Table I and in Tables II–IX, the agglomerated cement materials produced in accordance with the present invention had particle sizes which were significantly larger than the particle size of a typical class H Portland cement. As shown in Table I, the agglomerated cement materials had specific surface areas ranging from 0.0503 m²/cc to 0.2113 m²/cc whereas the untreated class H Portland cement sample had a specific surface area of 0.5175 m²/cc. Further, as indicated in Tables II–IX, the particles of the inventive agglomerated cement materials (1) were much larger than were the particles of the untreated class H Portland cement and (2) had a much narrower size distribution than did the untreated class H cement particles.

TABLE I

PREPARATION PARAMETERS AND SPECIFIC SURFACE AREAS OF SAMPLES 1–12

| Sample No. | Cement Class | PVA[1] Solution Type | Amount of PVA Solution Used (Grams Per Kg of Cement) | Fluidizing Air Temp. (°C.) | PVA Solution Inlet Pressure (psig) | PVA Solution Injection Rate (mL/min.) | Specific Surface Area (m²/cc) |
|---|---|---|---|---|---|---|---|
| 1 | H | — | — | — | — | — | 0.5175 |
| 2 | H | 51-05[2] | 400 | 40 | 30 | 8 | — |
| 3 | H | 52-22[3] | 200 | 40 | 30 | 8 | — |
| 4 | H | 52-22[3] | 400 | 40 | 30 | 8 | 0.1100 |
| 5 | H | 52-22[3] | 100 | 40 | 30 | 8 | 0.1527 |
| 6 | H | 52-22[3] | 100 | 60 | 30 | 4 | 0.2031 |
| 7 | H | 51-05[2] | 200 | 60 | 30 | 4 | 0.1239 |
| 8 | H | 51-05[2] | 200 | 60 | 20 | 4 | 0.0503 |
| 9 | H | 51-05[2] | 200 | 60 | 25 | 4 | 0.1401 |
| 10 | H | 51-05[2] | 100 | 60 | 25 | 4 | 0.2113 |
| 11 | A | 51-05[2] | 100 | 60 | 25 | 4 | — |
| 12[4] | H | 52-22[3] | 100 | 60 | 30 | 4 | 0.1881 |

[1]All PVA solutions were composed of water and polyvinyl alcohol (PVA). Each PVA solution contained 5% by weight PVA based on the total weight of the PVA solution.
[2]ELVANOL 51-05 polyvinyl alcohol having a molecular weight of 22,000–26,000 and a degree of hydrolysis of 87–89%.
[3]ELVANOL 52-22 polyvinyl alcohol having a molecular weight of 57,000–66,000 and a degree of hydrolysis of 87–89%.
[4]The PVA solution used in preparing Sample No. 12 was composed of water, 5% by weight ELVANOL 51-05 (based on the total weight of the PVA solution), and 5% by weight CFR-3 cement dispersant (based on the total weight of the PVA solution). CFR-3 is a sulfonated acetone/formaldehyde condensate dispersant manufactured by SKW Chemicals, Inc.

TABLE II

PARTICLE SIZE DISTRIBUTION OF SAMPLE NO. 1

| Size Microns | % Under | % In Band | Size Microns | % Under | % In Band |
|---|---|---|---|---|---|
| 188.0 | 100.0 | 0.1 | 17.7 | 39.1 | 4.6 |
| 162.0 | 99.9 | 0.1 | 15.3 | 34.4 | 4.4 |
| 140.0 | 99.8 | 0.1 | 13.2 | 30.1 | 4.0 |
| 121.0 | 99.7 | 0.1 | 11.4 | 26.1 | 3.7 |
| 104.0 | 99.6 | 0.0 | 9.8 | 22.4 | 3.2 |
| 89.9 | 99.6 | 1.8 | 8.5 | 19.2 | 2.9 |
| 77.5 | 97.8 | 5.1 | 7.3 | 16.3 | 2.7 |
| 66.9 | 92.6 | 6.5 | 6.3 | 13.6 | 2.8 |
| 57.7 | 86.1 | 5.9 | 5.4 | 10.8 | 2.6 |
| 49.8 | 80.2 | 5.0 | 4.7 | 8.2 | 2.1 |
| 42.9 | 75.3 | 5.0 | 4.1 | 6.2 | 3.4 |
| 37.1 | 70.2 | 6.1 | 3.5 | 4.8 | 1.2 |
| 32.0 | 64.1 | 6.8 | 3.0 | 3.5 | 0.9 |
| 27.6 | 57.3 | 6.8 | 2.6 | 2.6 | 0.7 |
| 23.8 | 50.5 | 6.2 | 2.2 | 1.9 | 0.6 |
| 20.5 | 44.3 | 5.2 | 1.9 | 1.3 | |

TABLE III

PARTICLE SIZE DISTRIBUTION OF SAMPLE NO. 4

| Size Microns | % Under | % In Band | Size Microns | % Under | % In Band |
|---|---|---|---|---|---|
| 564.0 | 100.0 | 0.1 | 53.1 | 30.4 | 7.6 |
| 487.0 | 99.9 | 0.2 | 45.8 | 22.8 | 6.1 |
| 420.0 | 99.7 | 0.2 | 39.5 | 16.8 | 4.3 |
| 362.0 | 99.5 | 0.2 | 34.1 | 12.5 | 3.1 |
| 312.0 | 99.3 | 0.2 | 29.4 | 9.3 | 2.5 |
| 270.0 | 99.1 | 0.5 | 25.4 | 6.8 | 2.2 |
| 233.0 | 98.6 | 1.1 | 21.9 | 4.6 | 1.5 |
| 201.0 | 97.5 | 1.7 | 18.9 | 3.1 | 0.9 |
| 173.0 | 95.7 | 2.3 | 16.3 | 2.2 | 0.8 |
| 149.0 | 93.5 | 3.4 | 14.1 | 1.4 | 0.5 |
| 129.0 | 90.1 | 6.2 | 12.1 | 0.9 | 0.3 |
| 111.0 | 83.9 | 9.4 | 10.5 | 0.6 | 0.3 |
| 95.9 | 74.5 | 11.7 | 9.0 | 0.3 | 0.2 |
| 82.7 | 62.8 | 12.2 | 7.8 | 0.1 | 0.0 |
| 71.4 | 50.6 | 11.1 | 6.7 | 0.1 | 0.1 |
| 61.6 | 39.5 | 9.1 | 5.8 | 0.0 | |

TABLE IV

PARTICLE SIZE DISTRIBUTION OF SAMPLE NO. 5

| Size Microns | % Under | % In Band | Size Microns | % Under | % In Band |
|---|---|---|---|---|---|
| 564.0 | 100.0 | 0.1 | 53.1 | 44.4 | 8.2 |
| 487.0 | 99.9 | 0.2 | 45.8 | 36.3 | 7.5 |
| 420.0 | 99.7 | 0.3 | 39.5 | 28.8 | 5.9 |

TABLE IV-continued

PARTICLE SIZE DISTRIBUTION OF SAMPLE NO. 5

| Size Microns | % Under | % In Band | Size Microns | % Under | % In Band |
|---|---|---|---|---|---|
| 362.0 | 99.4 | 0.3 | 34.1 | 22.9 | 4.9 |
| 312.0 | 99.1 | 0.2 | 29.4 | 17.9 | 4.3 |
| 270.0 | 98.8 | 0.7 | 25.4 | 13.7 | 3.2 |
| 233.0 | 98.2 | 1.6 | 21.9 | 10.4 | 2.4 |
| 201.0 | 96.6 | 2.1 | 18.9 | 8.0 | 2.4 |
| 173.0 | 94.5 | 2.1 | 16.3 | 5.6 | 1.7 |
| 149.0 | 92.5 | 2.4 | 14.1 | 4.0 | 1.3 |
| 129.0 | 90.0 | 4.3 | 12.1 | 2.7 | 0.7 |
| 111.0 | 85.7 | 6.7 | 10.5 | 1.9 | 0.2 |
| 95.9 | 79.0 | 8.4 | 9.0 | 1.7 | 0.2 |
| 82.7 | 70.6 | 8.9 | 7.8 | 1.5 | 0.3 |
| 71.4 | 61.7 | 8.8 | 6.7 | 1.2 | 0.4 |
| 61.6 | 52.9 | 8.4 | 5.8 | 0.8 | |

TABLE V

PARTICLE SIZE DISTRIBUTION OF SAMPLE NO. 6

| Size Microns | % Under | % In Band | Size Microns | % Under | % In Band |
|---|---|---|---|---|---|
| 564.0 | 100.0 | 0.0 | 53.1 | 59.7 | 11.4 |
| 487.0 | 100.0 | 0.0 | 45.8 | 48.3 | 9.7 |
| 420.0 | 100.0 | 0.0 | 39.5 | 38.6 | 7.2 |
| 362.0 | 100.0 | 0.0 | 34.1 | 31.4 | 5.7 |
| 312.0 | 100.0 | 0.1 | 29.4 | 25.7 | 5.0 |
| 270.0 | 99.9 | 0.2 | 25.4 | 20.7 | 4.5 |
| 233.0 | 99.7 | 0.2 | 21.9 | 16.3 | 3.7 |
| 201.0 | 99.5 | 0.3 | 18.9 | 12.6 | 2.9 |
| 173.0 | 99.2 | 0.3 | 16.3 | 9.6 | 2.2 |
| 149.0 | 98.9 | 1.1 | 14.1 | 7.4 | 1.6 |
| 129.0 | 97.8 | 2.2 | 12.1 | 5.8 | 1.0 |
| 111.0 | 95.6 | 3.5 | 10.5 | 4.8 | 1.0 |
| 95.9 | 92.1 | 5.0 | 9.0 | 3.8 | 0.8 |
| 82.7 | 87.1 | 6.7 | 7.8 | 3.0 | 0.8 |
| 71.4 | 80.4 | 9.2 | 6.7 | 2.2 | 0.8 |
| 61.6 | 71.1 | 11.4 | 5.8 | 1.4 | |

TABLE VI

PARTICLE SIZE DISTRIBUTION OF SAMPLE NO. 7

| Size Microns | % Under | % In Band | Size Microns | % Under | % In Band |
|---|---|---|---|---|---|
| 564.0 | 100.0 | 0.0 | 53.1 | 47.0 | 14.8 |
| 487.0 | 100.0 | 0.1 | 45.8 | 32.1 | 12.7 |
| 420.0 | 99.9 | 0.1 | 39.5 | 19.4 | 7.7 |
| 362.0 | 99.8 | 0.1 | 34.1 | 11.7 | 4.1 |
| 312.0 | 99.7 | 0.0 | 29.4 | 7.6 | 2.7 |
| 270.0 | 99.7 | 0.3 | 25.4 | 5.0 | 1.8 |
| 233.0 | 99.4 | 0.9 | 21.9 | 3.1 | 1.1 |
| 201.0 | 98.4 | 1.3 | 18.9 | 2.1 | 0.6 |
| 173.0 | 97.1 | 1.5 | 16.3 | 1.5 | 0.5 |
| 149.0 | 95.6 | 1.6 | 14.1 | 1.0 | 0.3 |
| 129.0 | 94.0 | 2.1 | 12.1 | 0.7 | 0.2 |
| 111.0 | 91.8 | 3.2 | 10.5 | 0.5 | 0.1 |
| 95.9 | 88.7 | 5.8 | 9.0 | 0.4 | 0.0 |
| 82.7 | 82.9 | 9.4 | 7.8 | 0.3 | 0.1 |
| 71.4 | 73.5 | 12.3 | 6.7 | 0.2 | 0.1 |
| 61.6 | 61.2 | 14.2 | 5.8 | 0.1 | |

TABLE VII

PARTICLE SIZE DISTRIBUTION OF SAMPLE NO. 8

| Size Microns | % Under | % In Band | Size Microns | % Under | % In Band |
|---|---|---|---|---|---|
| 564.0 | 100.0 | 0.7 | 53.1 | 7.7 | 1.7 |
| 487.0 | 99.3 | 2.3 | 45.8 | 6.0 | 1.6 |
| 420.0 | 97.1 | 4.2 | 39.5 | 4.4 | 1.0 |
| 362.0 | 92.9 | 6.4 | 34.1 | 3.4 | 0.9 |
| 312.0 | 86.5 | 8.7 | 29.4 | 2.5 | 0.6 |
| 270.0 | 77.8 | 11.4 | 25.4 | 1.9 | 0.5 |
| 233.0 | 66.3 | 12.6 | 21.9 | 1.5 | 0.4 |
| 201.0 | 53.7 | 11.7 | 18.9 | 1.1 | 0.2 |
| 173.0 | 42.0 | 8.4 | 16.3 | 0.8 | 0.1 |
| 149.0 | 33.6 | 5.1 | 14.1 | 0.7 | 0.1 |
| 129.0 | 28.5 | 4.5 | 12.1 | 0.5 | 0.2 |
| 111.0 | 24.0 | 5.2 | 10.5 | 0.4 | 0.1 |
| 95.9 | 18.8 | 4.7 | 9.0 | 0.2 | 0.0 |
| 82.7 | 14.1 | 3.0 | 7.8 | 0.2 | 0.1 |
| 71.4 | 11.1 | 1.9 | 6.7 | 0.1 | 0.0 |
| 61.6 | 9.2 | 1.5 | 5.8 | 0.0 | |

TABLE VIII

PARTICLE SIZE DISTRIBUTION OF SAMPLE NO. 9

| Size Microns | % Under | % In Band | Size Microns | % Under | % In Band |
|---|---|---|---|---|---|
| 564.0 | 100.0 | 0.0 | 53.1 | 45.5 | 11.9 |
| 487.0 | 100.0 | 0.0 | 45.8 | 33.7 | 10.0 |
| 420.0 | 100.0 | 0.0 | 39.5 | 23.7 | 6.9 |
| 362.0 | 100.0 | 0.0 | 34.1 | 16.8 | 4.5 |
| 312.0 | 100.0 | 0.0 | 29.4 | 12.3 | 3.1 |
| 270.0 | 100.0 | 0.1 | 25.4 | 9.2 | 2.6 |
| 233.0 | 99.8 | 0.2 | 21.9 | 6.6 | 2.0 |
| 201.0 | 99.6 | 0.2 | 18.9 | 4.6 | 1.2 |
| 173.0 | 99.4 | 0.3 | 16.3 | 3.4 | 1.0 |
| 149.0 | 99.1 | 1.3 | 14.1 | 2.4 | 0.5 |
| 129.0 | 97.8 | 3.2 | 12.1 | 1.9 | 0.3 |
| 111.0 | 94.6 | 5.5 | 10.5 | 1.5 | 0.4 |
| 95.9 | 89.0 | 8.2 | 9.0 | 1.2 | 0.3 |
| 82.7 | 80.8 | 10.6 | 7.8 | 0.9 | 0.3 |
| 71.4 | 70.2 | 12.1 | 6.7 | 0.6 | 0.2 |
| 61.6 | 58.1 | 12.6 | 5.8 | 0.4 | |

TABLE IX

PARTICLE SIZE DISTRIBUTION OF SAMPLE NO. 10

| Size Microns | % Under | % In Band | Size Microns | % Under | % In Band |
|---|---|---|---|---|---|
| 564.0 | 100.0 | 0.0 | 53.1 | 72.7 | 10.9 |
| 487.0 | 100.0 | 0.0 | 45.8 | 61.8 | 10.8 |
| 420.0 | 100.0 | 0.0 | 39.5 | 51.0 | 9.5 |
| 362.0 | 100.0 | 0.0 | 34.1 | 41.5 | 8.6 |
| 312.0 | 100.0 | 0.0 | 29.4 | 32.9 | 7.8 |
| 270.0 | 100.0 | 0.0 | 25.4 | 25.1 | 6.3 |
| 233.0 | 100.0 | 0.1 | 21.9 | 18.8 | 4.7 |
| 201.0 | 99.9 | 0.3 | 18.9 | 14.1 | 3.8 |
| 173.0 | 99.7 | 0.6 | 16.3 | 10.3 | 3.0 |
| 149.0 | 99.1 | 0.8 | 14.1 | 7.2 | 2.2 |
| 129.0 | 98.3 | 0.8 | 12.1 | 5.1 | 1.1 |
| 111.0 | 97.5 | 1.8 | 10.5 | 3.9 | 1.1 |
| 95.9 | 95.7 | 3.0 | 9.0 | 2.8 | 0.8 |
| 82.7 | 92.7 | 4.0 | 7.8 | 2.0 | 0.7 |
| 71.4 | 88.6 | 6.5 | 6.7 | 1.3 | 0.6 |
| 61.6 | 82.1 | 9.4 | 5.8 | 0.8 | |

EXAMPLE 2

Three cement slurry compositions were prepared and tested in accordance with the requirements of API Spec 10 in order to examine the effect of PVA addition on cementing effectiveness. As indicated in Table X, the first cement slurry composition (Slurry No. 10-1) consisted simply of 100 pbw class H cement mixed with 38 pbw of water. The second cement slurry composition (Slurry No. 10-2) consisted of 100 pbw of the inventive agglomerated Sample No. 10 material produced in Example 1 mixed with 38 pbw of water. The third cement slurry composition (Slurry No. 10-3) had essentially the same composition as the second slurry composition but consisted simply of 100 pbw of class H cement and 0.625 pbw of PVA mixed with 38 pbw of water.

TABLE X

COMPRESSIVE STRENGTH DEVELOPMENT: API SPEC 10

| Slurry No. | Slurry Composition | 8 Hour/140° F. Compressive Strength (psi) |
|---|---|---|
| 10-1 | Class H cement mixed with water | 1700 |
| 10-2 | Agglomerated Sample No. 10 mixed with water | 780 |
| 10-3 | Class H cement mixed with PVA[(1)] and water | 1550 |

[(1)]ELVANOL 51-05.

As seen by comparing Slurry No. 10-3 with Slurry No. 10-1, the addition of PVA to a cement slurry composition has a slight effect on the composition's cementing effectiveness. As shown in Table X, Slurry No. 10-1, which consisted of only cement and water, exhibited a compressive strength of 1700 psi whereas Slurry No. 10-3, which consisted of cement, PVA, and water, exhibited a compressive strength of 1550 psi.

The results provided in Table X also indicate that the cement slurry formed from agglomerated sample 10 had a compressive strength substantially less than the compressive strength slurry 10-1. However, since the slurry compositions of Table X were prepared in accordance with the requirements of API Spec 10, these compositions were mixed in a WARING BLENDER for a total of only 50 seconds (i.e., 15 seconds at 4,000 rpm and 35 seconds at 12,000 rpm). This mixing time was apparently not sufficient to completely dissolve the binder material of the inventive agglomerate and thereby release all of the individual particles of the agglomerate for hydration. As will be illustrated below, substantially complete dissolution of the binder material of the inventive agglomerate can be obtained by using a slightly greater mixing time and/or an increased amount of mixing shear.

EXAMPLE 3

As indicated in Table XI, Slurry Compositions 11-1, 11-2, 11-3, and 11-4 were prepared by mixing, respectively, 100 parts by weight of inventive Sample No. 6, 100 parts by weight of inventive Sample No. 9, 100 parts by weight of inventive Sample No. 10, and 100 parts of weight of untreated class H cement with 38 parts by weight of water. Compositions 11-1, 11-2, 11-3, and 11-4 were then tested in accordance with the API thickening time test. As indicated in Table XI, untreated cement Slurry No. 11-4 thickened in one hour and 25 minutes whereas Slurry No. 11-2 thickened in two hours, Slurry No. 11-2 thickened in one hour and 50 minutes, and Slurry No. 11-3 thickened in one hour and 54 minutes. Thickening time is a measure of the time required to obtain hydration of a given cement material. Thus, as will be understood by those skilled in the art, the results shown in Table XI indicate that, when a slightly greater slurry mixing time is used, the binder material of the inventive agglomerate material will more thoroughly dissolve and thereby release the individual cement particles of the agglomerate material for hydration.

TABLE XI

EFFECT OF AGGLOMERATION ON THICKENING TIME: API THICKENING TIME TEST

| Slurry No. | Slurry Composition[(1)] | 125° F. Thickening Time (Hours:Minutes) |
|---|---|---|
| 11-1 | Sample No. 6 | 2:00 |
| 11-2 | Sample No. 9 | 1:50 |
| 11-3 | Sample No. 10 | 1:54 |
| 11-4 | Neat Class H Cement | 1:25 |

[(1)]For testing, each composition was mixed with water. The water content of each resulting cement slurry was 38% by weight based on the weight of the cement material used in the slurry.

EXAMPLE 4

Slurry Compositions 12-1 through 12-6 were prepared in order to determine the effect of the presence of PVA on cement slurry viscosity. Slurry Compositions 12-2 through 12-5 were prepared as indicated in Table XII by directly mixing class H cement with PVA and water in the amounts indicated in Table XII. Slurry No. 12-1 consisted simply of class H cement and water. Slurry Composition 12-6 consisted of 100 pbw of the inventive agglomerated Sample No. 12 material produced in Example 1 mixed with 38 pbw of water.

The results shown in Table XII indicate that the presence of PVA in a cement slurry composition increases the viscosity of the composition. However, through the use of a suitable dispersant, highly PVA loaded compositions having very low viscosities can be obtained.

TABLE XII

EFFECT OF PVA ON CEMENT SLURRY VISCOSITY

| Slurry No. | PVA Type | Amount of PVA Added to Cement Slurry[3] (pbw per 100 pbw Cement) | Dispersant[4] (pbw per 100 pbw Cement) | 600 RPM | 300 RPM | 200 RPM | 100 RPM |
| --- | --- | --- | --- | --- | --- | --- | --- |
| 12-1 | — | 0 | 0 | 124 | 90 | 80 | 66 |
| 12-2 | 52-22[1] | 2 | 0 | 600+ | 600+ | 470 | 282 |
| 12-3 | 52-22[1] | 1 | 0 | 352 | 228 | 182 | 124 |
| 12-4 | 51-05[2] | 2 | 0 | 344 | 210 | 162 | 108 |
| 12-5 | 51-05[2] | 1 | 0 | 184 | 126 | 104 | 80 |
| 12-6[6] | 52-22[1] | 0.5 | 0.5 | 135 | 75 | 51 | 28 |

[1]ELVANOL 52-22.
[2]ELVANOL 51-05.
[3]Each cement slurry contained 38 pbw water per 100 pbw of cement material.
[4]CFR-3 cement dispersant manufactured by SKW Chemicals, Inc.
[5]Determined in a FANN Model 35 viscometer immediately after blend mixing in a WARING BLENDER.
[6]100 pbw of the inventive agglomerated Sample No. 12 material blended with 38 pbw of water.

EXAMPLE 5

An inventive agglomerated cement sample (i.e., Sample No. 13) was prepared in the same manner as Sample No. 12 using 1000 g of class A cement and 150 g of binder material solution. As was the case in preparing Sample No. 12, the binder material solution used in preparing Sample No. 13 was composed of 5 pbw ELVANOL 52-22, 5 pbw CFR-3, and 90 pbw water.

Seven cement slurry compositions (i.e., Slurries 13-1 through 13-7) were prepared and tested for compressive strength development. Slurries 13-1 and 13-4 were each composed of 100 pbw of class H cement and 38 pbw of water. Slurries 13-2 and 13-5 were each composed of 100 pbw of inventive Sample No. 12 and 38 pbw water. Slurry No. 13-3 was composed of 100 pbw of inventive Sample No. 12, 2 pbw of an accelerating agent (i.e., calcium chloride), and 38 pbw water. Slurry No. 13-6 was composed of 100 pbw class A cement and 46 pbw water. Slurry No. 13-7 was composed of 100 pbw of inventive Sample No. 13 and 46 pbw water.

Slurries 13-1, 13-2, 13-3, 13-6, and 13-7 were each mixed in a WARING BLENDER according to the requirements of API Spec. 10. Slurries 13-4 and 13-5, on the other hand, were each mixed in a WARING BLENDER for five minutes at 12,000 rpm. It is noted that, in the API Spec. 10 mixing procedure, a mixer speed of 12,000 rpm is maintained for only 35 seconds.

TABLE XIII

COMPRESSIVE STRENGTH DEVELOPMENT

| Slurry No. | Cement Material | 80° F. | 140° F. | 200° F. |
| --- | --- | --- | --- | --- |
| 13-1[1] | Neat Class H | 1320 | 3730 | 3150 |
| 13-2[1] | Sample No. 12 | 790 | 2870 | 3280 |
| 13-3[1] | Sample No. 12 + CaCl$_2$ | 1980 | — | — |
| 13-4[2] | Neat Class H | 2230 | — | — |
| 13-5[2] | Sample No. 12 | 1450 | — | — |
| 13-6[1] | Neat Class A | 2080 | — | — |
| 13-7[1] | Sample No. 13 | 1270 | — | — |

[1]Slurry blended in WARING BLENDER according to API Spec. 10.
[2]Slurry blended in WARING BLENDER at 12,000 rpm for 5 minutes.

The results shown in Table XIII indicate that, by increasing mixing time, by increasing the amount of mixing shear imparted, and/or by adding an accelerator, the degree of hydration and cementing effectiveness of a cement slurry prepared using a cement agglomerate of the present invention can be caused to meet or exceed the corresponding properties of a cement slurry formed using a non-agglomerated cement material. The results provided in Table XIII also indicate that the compressive strength development of a slurry formed from a non-agglomerated cement material can be increased by increasing mixing time and/or mixing shear. The results provided in Table XIII further indicate that differences in compressive strength between an inventive cement slurry and a cement slurry formed from a non-agglomerated cement material diminish as curing temperature increases.

EXAMPLE 6

Agglomerated Samples 14-47 were prepared in accordance with the method of the present invention using an apparatus 2 of the type described hereinabove. Each of Samples 14-47 was prepared as indicated in Table XIV from class H cement using: 85 mL of binder material solution per 500 g of cement; a binder solution injection rate of 12 mL/min; and a fluidizing air temperature of 20° C. Following binder solution injection, each of Samples 14-47 was dried in apparatus 2 for 8 minutes using a fluidizing air temperature of 40° C. The binder solution used in each case was an aqueous solution containing either: (a) PVP K30 polyvinylpyrrolidone having a molecular weight of 40,000; (b) PVP K60 polyvinylpyrrolidone having a molecular weight of 220,000; (c) EXPO 300 polyvinyl alcohol; or (d) EXPO 400 polyvinyl alcohol.

The specific surface areas of Samples 14-47 are provided in Table XIV. The particle size distributions of Samples 22 and 23 are provided in Tables XV and XVI.

TABLE XIV

SAMPLES 14-47

| Sample No. | Binder | Binder Concentration (% by wt)[1] | Specific Surface Area (m$^2$/cc) |
| --- | --- | --- | --- |
| 14 | PVP K60 | 5.0 | 0.3730 |
| 15 | PVP K60 | 5.0 | 0.3701 |
| 16 | PVP K60 | 5.0 | 0.3551 |
| 17 | PVP K60 | 10.0 | 0.3610 |
| 18 | PVP K60 | 10.0 | 0.3646 |

TABLE XIV-continued

SAMPLES 14–47

| Sample No. | Binder | Binder Concentration (% by wt)[1] | Specific Surface Area (m²/cc) |
|---|---|---|---|
| 19 | PVP K60 | 10.0 | 0.3219 |
| 20 | PVP K60 | 15.0 | 0.3899 |
| 21 | PVP K60 | 15.0 | 0.3733 |
| 22 | PVP K60 | 15.0 | 0.1850 |
| 23 | PVP K60 | 20.0 | 0.2948 |
| 24 | PVP K60 | 20.0 | 0.3803 |
| 25 | PVP K60 | 20.0 | 0.3369 |
| 26 | PVP K60 | 25.0 | 0.3479 |
| 27 | PVP K60 | 25.0 | 0.3331 |
| 28 | PVP K60 | 25.0 | 0.3269 |
| 29 | PVP K30 | 5.0 | 0.3452 |
| 30 | PVP K30 | 5.0 | 0.3488 |
| 31 | PVP K30 | 5.0 | 0.3610 |
| 32 | PVP K30 | 10.0 | 0.3932 |
| 33 | PVP K30 | 10.0 | 0.3602 |
| 34 | PVP K30 | 10.0 | 0.3561 |
| 35 | PVP K30 | 15.0 | 0.3697 |
| 36 | PVP K30 | 15.0 | 0.3767 |
| 37 | PVP K30 | 15.0 | 0.3637 |
| 38 | PVP K30 | 20.0 | 0.3162 |
| 39 | PVP K30 | 20.0 | 0.3015 |
| 40 | PVP K30 | 20.0 | 0.3122 |
| 41 | PVP K30 | 25.0 | 0.3370 |
| 42 | PVP K30 | 25.0 | 0.3265 |
| 43 | PVP K30 | 25.0 | 0.3076 |
| 44 | EXPO 400 | 10.0 | 0.3189 |
| 45 | EXPO 300 | 10.0 | 0.3660 |
| 46 | EXPO 400 | 30.0 | 0.3101 |
| 47 | EXPO 300 | 30.0 | 0.3379 |

[1]Percent by weight based on the total weight of the binder material solution.

TABLE XV

PARTICLE SIZE DISTRIBUTION OF SAMPLE NO. 22

| Size Microns | Percent Under | Percent In Band |
|---|---|---|
| 564.0 | 100.0 | 0.0 |
| 487.0 | 100.0 | 0.0 |
| 420.0 | 100.0 | 0.0 |
| 362.0 | 100.0 | 0.0 |
| 312.0 | 100.0 | 0.0 |
| 270.0 | 100.0 | 0.2 |
| 233.0 | 99.8 | 0.4 |
| 201.0 | 99.4 | 0.4 |
| 173.0 | 98.9 | 0.5 |
| 149.0 | 98.4 | 1.4 |
| 129.0 | 97.0 | 2.7 |
| 111.0 | 94.3 | 4.0 |
| 95.9 | 90.3 | 6.4 |
| 82.7 | 83.9 | 9.0 |
| 71.4 | 74.9 | 10.0 |
| 61.6 | 64.9 | 9.9 |
| 53.1 | 55.0 | 9.4 |
| 45.8 | 45.7 | 8.8 |
| 39.5 | 36.9 | 7.9 |
| 34.1 | 29.0 | 6.5 |
| 29.4 | 22.6 | 4.6 |
| 25.4 | 18.0 | 3.6 |
| 21.9 | 14.4 | 3.2 |
| 18.9 | 11.2 | 2.9 |
| 16.3 | 8.3 | 2.4 |
| 14.1 | 5.9 | 1.6 |
| 12.1 | 4.3 | 0.8 |
| 10.5 | 3.6 | 0.7 |
| 9.0 | 2.8 | 0.6 |
| 7.8 | 2.3 | 0.6 |
| 6.7 | 1.7 | 0.6 |
| 5.8 | 1.1 | |

TABLE XVI

PARTICLE SIZE DISTRIBUTION OF SAMPLE NO. 23

| Size Microns | Percent Under | Percent In Band |
|---|---|---|
| 564.0 | 100.0 | 0.0 |
| 487.0 | 100.0 | 0.0 |
| 420.0 | 100.0 | 0.0 |
| 362.0 | 100.0 | 0.0 |
| 312.0 | 100.0 | 0.0 |
| 270.0 | 100.0 | 0.1 |
| 233.0 | 99.9 | 0.1 |
| 201.0 | 99.8 | 0.1 |
| 173.0 | 99.6 | 0.3 |
| 149.0 | 99.4 | 1.0 |
| 129.0 | 98.4 | 2.1 |
| 111.0 | 96.3 | 3.2 |
| 95.9 | 93.0 | 4.9 |
| 82.7 | 88.2 | 6.4 |
| 71.4 | 81.7 | 7.2 |
| 61.6 | 74.5 | 7.2 |
| 53.1 | 67.3 | 6.6 |
| 45.8 | 60.7 | 6.4 |
| 39.5 | 54.3 | 6.9 |
| 34.1 | 47.4 | 6.8 |
| 29.4 | 40.6 | 5.9 |
| 25.4 | 34.7 | 5.2 |
| 21.9 | 29.5 | 4.8 |
| 18.9 | 24.6 | 4.7 |
| 16.3 | 19.9 | 4.1 |
| 14.1 | 15.8 | 3.1 |
| 12.1 | 12.7 | 2.0 |
| 10.5 | 10.6 | 1.7 |
| 9.0 | 9.0 | 1.6 |
| 7.8 | 7.4 | 1.8 |
| 6.7 | 5.5 | 1.9 |
| 5.8 | 3.7 | |

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of forming a dry, unhydraulized, agglomerated cement material comprising the steps of:

(a) fluidizing particles of dry Portland cement in a chamber by conducting a gas through said chamber which causes said particles to separate and roll in said chamber; and (b) introducing an aqueous solution consisting essentially of water and a water-soluble binder material to said chamber whereby as said gas travels through said chamber, said gas evaporates said water to thereby remove said water from said solution and prevent said water from hydrating said particles and said binder material deposits on said particles and bonds said particles together in an agglomerated form;

wherein said binder material is polyvinyl alcohol having a degree of hydrolysis in the range of from about 87 percent to about 89 percent and a molecular weight in the range of from about 30,000 to about 80,000, and wherein the specific surface area of said agglomerated cement material is in the range of from about 0.050 to about 0.300 m²/cc.

2. The method of claim 1 wherein said solution further includes a dispersant which is deposited on said fluidized particles of cement wherein said dispersant is a naphthalene sulfonic acid/formaldehyde condensate, a sulfonated acetone/formaldehyde condensate, or a combination thereof; said dispersant is present in said solution in an amount in the range of from about 1% to about 10% by weight; and said binder material is present in said solution in an amount in the range of from about 2% to about 10% by weight of said aqueous solution.

3. A method of cementing a casing in a wellbore comprising mixing an agglomerated cement material with water to form a cement slurry, and thereafter injecting said cement slurry into a well bore wherein said agglomerated cement material consists essentially of a plurality of particles of dry Portland cement bonded together by a water soluble binder material, wherein said binder material is polyvinyl alcohol having a degree of hydrolysis in the range of from about 87 percent to about 89 percent and a molecular weight in the range of from about 30,000 to about 80,000, and wherein the specific surface area of said agglomerated cement material is in the range of from about 0.050 to about 0.300 m²/cc.

4. The method of claim 3 wherein said agglomerated cement material further comprises a dispersant deposited on said cement particles wherein said dispersant is a naphthalene sulfonic acid/formaldehyde condensate, a sulfonated acetone/formaldehyde condensate, or a combination thereof.

5. A method of forming an agglomerated particulate cement material comprising the steps of:

(a) placing particles of unhydraulized Portland cement in a vessel having a frusto-conical portion;

(b) fluidizing said particles in said vessel by injecting a fluidizing gas into said vessel using a cone blender, whereby said particles are caused to separate and roll in said vessel, said cone blender being associated with said frusto-conical portion of said vessel; and (c) introducing an aqueous solution consisting essentially of water and a water-soluble binder material into said vessel whereby said water is vaporized and does not hydrate said particles and said binder material deposits on said fluidized particles to thereby bond said particles together to form said agglomerated particulate cement material;

wherein said binder material is polyvinyl alcohol having a degree of hydrolysis in the range of from about 87 percent to about 89 percent and a molecular weight in the range of from about 30,000 to about 80,000, and wherein the specific surface area of said agglomerated cement material is in the range of from about 0.050 to about 0.300 m²/cc.

6. The method of claim 5 wherein said fluidizing gas is pulsed into said vessel.

* * * * *